United States Patent

[11] 3,623,074

[72] Inventor David L. Bailey
Longmont, Colo.
[21] Appl. No. 837,084
[22] Filed June 27, 1969
[45] Patented Nov. 23, 1971
[73] Assignee International Business Machines Corporation
Armonk, N.Y.

[54] DIGITAL DATA RECOVERY BY WAVELENGTH INTERPRETATION
8 Claims, 10 Drawing Figs.

[52] U.S. Cl. ........ 340/347 DD, 340/174.1 H, 340/349
[51] Int. Cl. ........ H03k13/24, H04l 3/00
[50] Field of Search ........ 340/347 DD, 174.1 H; 328/34; 307/234; 178/68; 325/38, 321

[56] References Cited

UNITED STATES PATENTS

| | | | |
|---|---|---|---|
| 3,349,328 | 10/1967 | Hunkins et al. | 325/38 |
| 3,452,348 | 6/1969 | Vallee | 340/347 |
| 3,467,955 | 9/1969 | Poumakis | 340/174.1 |
| 3,514,706 | 5/1970 | Dupraz et al. | 340/347 X |
| 3,349,389 | 10/1967 | Simanavicius | 340/347 DD |
| 3,510,780 | 5/1970 | Buehrle | 340/347 DD X |

*Primary Examiner*—Maynard R. Wilbur
*Assistant Examiner*—Michael K. Wolensky
*Attorneys*—Hanifin and Jancin and Earl C. Hancock

ABSTRACT: Binary data is recovered from waveforms encoded in phase encoded, double frequency, MFE, MZE, or similar patterns by sensing wavelengths preceding and/or following a transition in the waveform at approximately the center of a bit cell. The gating of "1's" and "o's" from data related clock pulses is switched as a function of that sensing. In one embodiment, wavelengths are interpreted by direct logic to coordinate the switching of the gated "1's" and "0's." In another embodiment, clock pulses are counted into alternately active paths with the outputs of these paths being logically interpreted to control the gating.

INVENTOR
DAVID L. BAILEY
BY Earl C. Hancock
ATTORNEY

DIGITAL DATA RECOVERY BY WAVELENGTH INTERPRETATION

BACKGROUND OF THE INVENTION

1. Field of the Invention

This invention relates to data processing equipment for separating binary data which is comingled within a complex waveform. More particularly, the present invention relates to apparatus for separating commingled "0's" and "1's" within waveforms that contain data encoded in phase encoded, double frequency, MFE, MZE or similarly encoded patterns. Although not specifically limited thereto, this invention is particularly useful for deciphering the binary data contained in waveforms as read from magnetic tape, discs, data communication lines, or the like.

2. Description of the Prior Art

For high speed and high density recording on magnetic media, such as tape or discs, the so-called phase encoded, double frequency, MFE, or MZE recording waveforms have become particularly attractive. The main benefit of these encoding systems resides in the fact that a minimum number of magnetic flux transitions is necessary for representing binary bits. For instance, in systems for reading phase encoded (PE) data in one direction, a negative transition at the center of a bit cell might represent a binary "1" while a positive transition at the center of a bit cell represents a binary "O." When reading this same PE data form the opposite direction, the converse holds true in that a positive transition at the bit cell center will represent a "1" and a negative transition a "0." Thus, for any given binary bit, a maximum of two flux transitions would be required and, in many cases, only one transition is necessary. In the modified frequency encoded system (MFE), binary data is represented by a single flux transition for each bit cell with this transition occurring at approximately the center of the bit cell to represent a "1" while a transition at the boundary of a bit cell represents a "0." Thus, where a consecutive sequence of "0's" is encountered, no transition whatsoever is required for more than one bit cell time with transitions occurring only a bit cell boundaries for every pair of "0's." For consecutive "1's," transitions at the center of each bit cell are all that are required. The modified zeros encoded (MZE) signals are similar except that they employ one additional wavelength of flux transitions are compared to MFE. The specifics of these encoding systems will be discussed in greater detail in the description of the preferred embodiments hereinafter.

The prior art systems for separating binary data from a complex waveform have taken several approaches. For instance, many systems initially segregate clock pulses from data pulses and then employ these clock pulses for inspecting the waveform a approximately the center of a bit cell. The transition or lack of transition or direction of transition is then interpreted to determine whether a "1" or a "0" is present. Patent application Ser. No. 464,773, "Information Detecting Apparatus," by Gindi, which was filed June 17, 1965, now U.S. Pat. No. 3,491,303, and which is assigned to the same assignee as this application, shows several systems for separating clock and data pulses from a complex waveform. Somewhat similar clock and data separation approaches are also shown in the Apr. 1963, IBM Technical Disclosure Bulletin (Volume 5, No. 11) in an article entitled, "Clock and Data Retrieval Circuit," by Fang et al. and in U.S. Pat. No. 3,114,899, by Gabor.

Another approach for separating binary data involves logical interpretation of the waveform by use of a complex Exclusive OR decoder, as is shown in U.S Pat. No. 3,217,183, "Binary Data Detection System," by Thompson et al. issued Nov. 9, 1965, and assigned to the same assignee as this invention. This Exclusive OR (EOR) interpreting circuitry of Thompson et al. is used to control integrator outputs which, in turn, control a Schmitt trigger for gating "1's" and "0's" from a clock pulse as the separated data. As will be apparent hereinafter, the Thompson et al. patent does not detect wavelength transitions within waveform patterns for data separating as is done with the present invention. Further, the use of integrator circuitry makes the Thompson et al. circuitry somewhat noise sensitive which is a disadvantage that is avoided by the present invention which uses an all-digital approach to data detection.

Another data separation system is shown in U.S. Pat. No. 3,293,555, "System for Controlling the Sampling of Serially Received Signal Elements," by Mazure et al., issued Dec. 20, 1966, and assigned to the same assignee as this application. Although a binary approach, the Mazure et al. patent is a system for shifting sample clock pulses so as to maintain them as close as possible to the center of the data cells. Thus, Mazure et al. is also interpreting the data transitions within the particular waveform and, thus, is particularly sensitive to phase-shifting problems.

SUMMARY OF THE INVENTION

The present invention provides an all-digital system for separating binary "1's" and "0's" from a complex waveform. It has been discovered that the waveforms encoded in the phase encoded (PE), MFE, MZE, or similar patterns include certain interpretable information in the form of long wavelengths associated with binary data shifts from one state to the other. That is, a "1" to "0" or "0" to "1" transition is always accompanied by a preceding and/or following long wavelength. The present invention provides a binary system using digital circuitry for interpreting those wavelengths to determine whether "1's" or "0's" should be gated out. Clock pulses are then used for the actual gating of data rather than independently inspecting each bit cell in the data pattern as was done in the prior art. This markedly increases the attractiveness of the present invention as compared to other systems since only digital circuitry is involved and since VFC originated clock signals are being used for gating data.

In magnetic media recording, the phase-shifting problem has been a chronic difficulty. This problem results from the recording of magnetic flux patterns within extremely small physical spacings so that the data bits on the medium tend to repel each other and move on the medium itself. Therefore, the data detection systems which must interpret the flux transitions sensed from the magnetic medium must be able to accommodate physical shifting of the binary data on the magnetic medium in interpreting the readback information. This means that a "window" with as wide a tolerance as possible must be employed for the purpose of inspecting the bit cells around their center positions and must not be excessively sensitive to flux transition shifting at the boundaries which typically would represent clock synchronization pulses. The present invention significantly accommodates this phase shifting by using the regularly recurring clock pulses generated within the interpreting circuitry to represent binary "1's" or "0's" at the output and using the clock pulses in conjunction with the wavelength and transition interpreting apparatus for controlling the switching of the gating between these binary states.

In one embodiment of this invention, the waveform pattern is inspected as received and the occurrence of a wavelength transition from a long wavelength to a short wavelength or vice versa, or two consecutive long wavelengths are logically interpreted to switch the gating of VFC originated pulses as binary "1's" and "0's" at the output. In another embodiment of this invention, clock pulses are introduced to either of two essentially parallel data inspecting patterns and counted in counting stages within those patterns to determine whether or not a long wavelength has occurred and, if so, to effect switching between the gating of binary "1's" and "0's." The present invention is particularly advantageous in that it is easily adapted to provide error indications when invalid long wavelengths are encountered.

An object of this invention is to interpret wavelengths within a complex data pattern for determining whether binary "1's" or "0's" should be gated at the output.

Another object of this invention is to logically interpret the wavelengths contained in a data pattern for determining whether binary "1's" or "0's" should be gated at the output and for doing this with digital circuitry.

Yet another object of this invention is to provide a system for separating binary data within waveforms encoded in phase encoded, MZE, MFE, or the like patterns.

A further object of this invention is to separate binary data within complex waveforms by interpreting both wavelength transitions and the physical positioning of the transition separating these wavelength transitions relative to a bit cell.

A further object of this invention is to provide a digital circuitry means for recognizing binary data contained in a complex waveform.

The foregoing and other objects, features and advantages of the present invention will be apparent from the following more particular detailed description of the preferred embodiments of the invention as are illustrated in the accompanying drawings.

BRIEF DESCRIPTION OF THE DRAWINGS

FIG. 3 and FIG. 8, FIG. 6 and 7 present the operating waveforms for FIG. 5 in a phase-encoded environment and in an MZE environment, respectively, FIG. 8 shows the utilization of the present invention for detecting binary data in an MZE pattern, FIG. 9 sets forth the operating waveforms of the FIG. 8 circuitry.

DESCRIPTION OF THE PREFERRED EMBODIMENTS

Referring now more particularly to the drawings, like numerals indicate like parts and structural features. Additionally, the same numeral will denote a structural feature as well as the signal on such structural feature. Example, numeral 10 denotes terminal 10 as well as the signal or input on terminal 10 as shown respectively in FIGS. 1 and 2. In the specification, the numeral 10 is always prefixed by either the word terminal or input to clearly denote what is intended.

Figure 1:
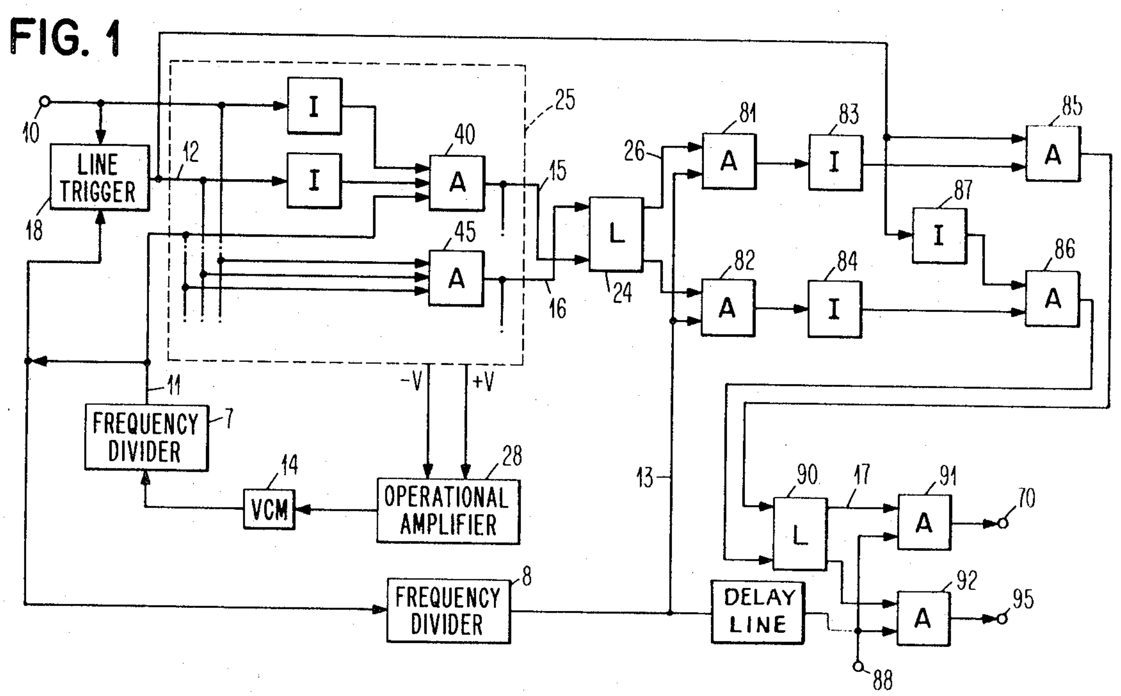
FIG. 1 shows logic circuitry for separating binary data from a phase-encoded waveform using logic circuitry for interpreting outputs of prior art circuitry.

FIG. 1 schematically illustrates the logic circuitry of the present invention wherein long wavelengths (signal portion) in the data waveform from a phase-encoded source are detected to prevent misinterpretation of the received data and to provide binary data separation at the output. The detection is accomplished by gating series of hit cell pulses that occur once for each bit cell to either of two output terminals 70 and 95 for providing the appearance of "1's" or "0's" between occurrences of long wavelengths. In the FIG. 1 circuitry, this gating of binary data is accomplished by logical interpretation of the long wavelengths in the waveform received at input terminal 10 and the appropriate setting of latch-type circuits. Long wavelength detection is more desirable than short wavelength (signal portion) detection as it is more reliable and, for magnetic tape systems, has a higher signal-to-noise ratio during tape lift-off. That is, the FIG. 1 circuitry, as compared to the binary data separation circuits using analog integrators, is more desirable because it uses digital circuitry throughout and, as compared to binary integrators, is more desirable since this invention operates from data developed clock signals.

In the past, information has been obtained from waveforms based upon wavelength separation. For instance, U.S. Pat. NO. 3,427,605, "Apparatus and Method for Recording Control code Between Data Blocks," by Gabor, which issued Feb. 11, 1969, shows circuitry in FIGS. 9 and 10 thereof for recognizing special control characters based upon long and short wavelengths. However, none of the prior art devices have suggested using the long and short wavelength sensing apparatus for controlling the gated separation of binary data (i.e., "0's" and "1's") from a complex encoded waveform.

Figure 5:
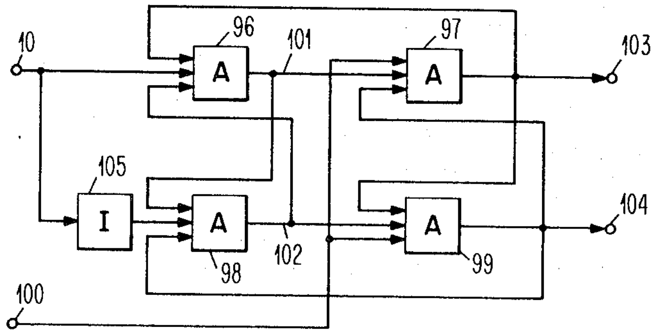
FIG. 5 depicts typical wavelength decoder circuitry useful for both

The wavelength interpreting operation of FIG. 1 has been found to be possible in conjunction with the circuitry representing an analog derived clock (ADC). The ADC is designed to provide clock signals that are bit synchronized with data and is shown in U.S. Pat. NO. 3,293,555, "System for Controlling the Sampling of serially Received Signal Elements," by Mazure et al. and also in the article in the IBM Technical Disclosure Bulletin of Aug., 1964, at pages 205–207 (Volume 7, No. 3) entitled, "System of Half Duplex Operation of the Analog Drive Clock," by Anello et al. To simplify the description, the following components of the circuitry shown in FIG. 1 hereof compare directly with components in the aforementioned Mazure et al. patent and Anello et al. article. These are:
frequency divider 7, input line 10, voltage controlled multivibrator VCM 14, line trigger 18 including the associated logic and capacitors present in the article and patent, and operational amplifier 28 which responds to the +V and −V inputs shown in the article and FIGS. 1 and 5 of the patent. The operational amplifier 28 in FIG. 1 hereof includes the functions of mixer 28, filter 30, and frequency control 32 of both the patent and the article. Like reference numeral are used as between the patent, article, and this description for the aforementioned components and, since the operation of these components is substantially the same as in the patent and article, a description thereof is omitted here. The specific circuitry contained in block 25 is shown in FIG. 5 of U.S. Pat. No. 3,293,555 including AND's 40 and 45. The circuitry and shown in FIG. 1 hereof utilizes the outputs of AND'40 and 45 for additional wavelength interpretation purposes as will be described hereinafter.

Figure 2:
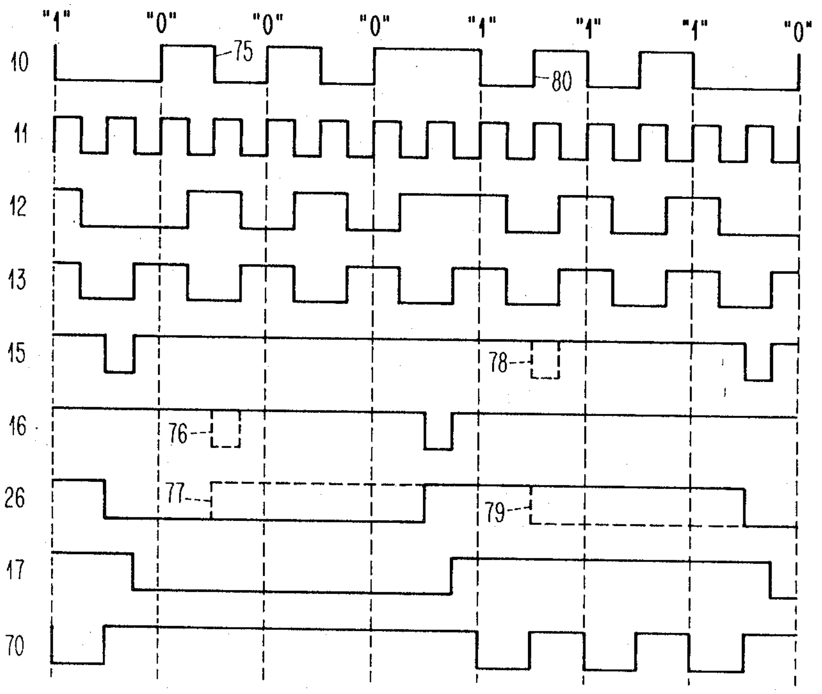
FIG. 2 is a time-base diagram for FIG. 1.

FIG. 2 provides a time-based diagram for the operation of the elements in the circuitry shown in FIG. 1. Sensed data introduced at terminal 10 contains "1's" as are indicated by negative transitions at the end of the positive pulses while "0's" are indicated by a rise at the beginning of the positive pulse, the transition between "1's" and "0's" and vice versa designated by intervening long wavelengths as shown. That is, a transition from "1" to "0" encompasses a long wavelength following the "1"; whereas a transition from "0" to "1" involves a long wavelength before the "1." A down level in the waveform at input 10 concurrent with the down level of line trigger 18 on line 12 and the presence of positive clock pulse 11 conditions AND 40 to produce signals on line 15 to reset latch 24. This sequence occurs for every long wavelength at a low or negative level as accompanies a "1" to "0" transition. Conversely, the presence of positive pulses or levels concurrently at terminal 10 and lines 11 and 12 causes AND 45 to produce an output signal on line 16 which sets latch 24. This latter circumstance occurs for every long wavelength at a positive level such as is associated with a "0" to "1" transition in the phase-encoded signals shown in FIG. 2 at line 10.

Under ideal conditions, the setting or resetting of latch 24 could be used to gate a pulse out for each "1" or "0" data bit that should follow a long wavelength detection. However, if the received data is shifted in phase slightly relative to ideal conditions, latch 24 could be inappropriately set or reset, thus misinterpreting the received data. For instance, if trailing edge 75 in FIG. 2 is delayed slightly, AND 45 would be conditioned, thereby producing the erroneous output pulse on line 16, as is shown in dashed lines at 76. This would cause latch 24 to produce the signal on line 26, as is shown in dashed lines at 77, and would improperly suggest that "1's" follow transition 75 instead of "0's." The opposite erroneous condition could occur, as is shown in dotted lines at 78 and 79, as a result of a shift of transition 80.

The foregoing misinterpretation of data is avoided by the remaining circuitry coupled to the outputs of latch 24 in FIG. 1. This circuitry functions in part from the fact that, during short wavelengths corresponding to "0's," lines 12 and 13 are 180° out of phase while lines 12 and 13 are in phase during short wavelengths corresponding to "1'S." Therefore, by gating line 13 through AND's 81 or 82, inverting these signals through 83 and 84, and combining the result with signal 12 through AND 85 or 86, latch 90 will be set or reset in response to a long wavelength detection. In effect, the changing of the state of latch 90 is prevented except during a long wavelength at input terminal 10.

As mentioned, the analog derived clock is used primarily to obtain bit synchronization with the information data. The portions of FIG. 1 which relate to the ADC have been mentioned hereinbefore. The present invention encompasses the gated ones/zeroes detection logic which utilizes selected lines from the ADC to produce a function which, when gated with the synchronized clock signal, yields properly gated data in separated form.

The clock signals which supplied over on line 11 as the output of frequency divider 7 control the generation of signals from frequency divider 8 on line 13, these signals being essentially a half frequency of the clock signals. By combining the half clock signals of line 13 with the line trigger signal 12, latch 90 is selectably set to provide gating. Invert circuit 87 is included to invert the line trigger signal so that AND 86 will be conditioned during the times that latch 90 should be reset for conditioning AND 92. The signals which are introduced to terminal 88 are signals which produce one pulse for each bit cell time and, therefore, are signals related to the line 13 frequency. However, the signals introduced to terminal 88 would be shifted by some amount, such as 90°, from the original clock signals at line 13 to eliminate potential race conditions and to put properly gated "1's" or "0's" into appropriate bit cells. Thus, setting of latch 90 raises line 17 so that AND 91 would be conditioned to gate pulses from terminal 88 to output terminal 70 with these pulses corresponding to "1" data bits. Similar gating is accomplished through AND 92 and conditioned by the reset side of latch 90 for gating "0" data bits out at 95. Therefore, the separated binary data originally introduced at terminal 10 is available at terminals 70 and 95.

Additional protection against slivering due to circuit delays can be obtained by ANDing the inverted clock signals at line 11 with the output of frequency divider 8 at line 13. The inverted result is used to provide the signals for line 13 as the input to AND's 81 and 82.

Figure 3:
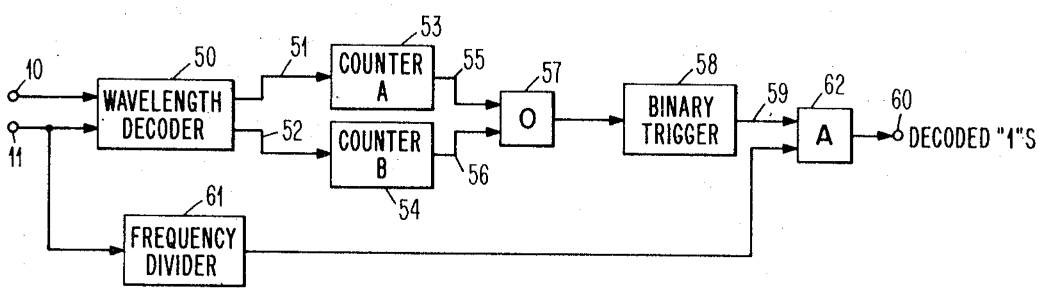
FIG. 3 illustrates another embodiment in accordance with this invention for separating binary data from a phase-encoded pattern, FIG. 4 contains the operating waveforms for FIG. 3.
Figure 4:
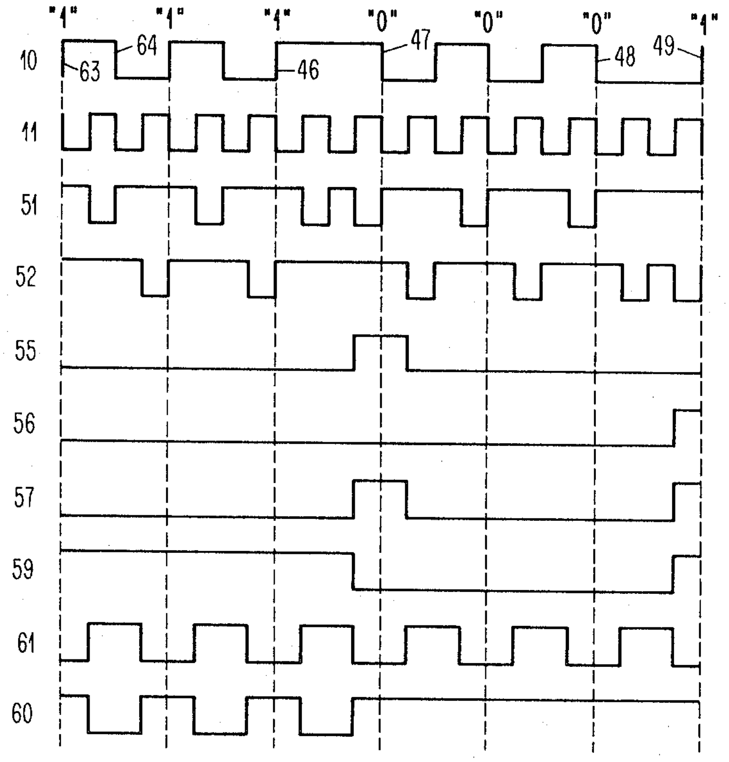

Another arrangement for wavelength detection using a completely digital approach for decoding phase encoded or PE signals is shown in FIG. 3 with the time-based diagram of the operation of the FIG. 3 circuitry being shown in FIG. 4. Although somewhat different from FIG. 1, both systems essentially provide data decoding by measuring wavelength and determining the phase of the known wavelength. The waveform pattern containing binary data in a commingled state is introduced to terminal 10, and clock signals which provide one cycle for each bit cell width are introduced to terminal 11, these clock signals having been generated by other apparatus, such as the aforementioned ADC. The FIG. 3 circuitry employs a wavelength decoder 50 which will be described in greater detail hereinafter in FIG. 5. Essentially, wavelength decoder 50 will alternately produce a pulse or two consecutive pulses on line 51 or 52 as a function of the time between waveform transitions. That is, the clock pulse at 11 will be gated out at 51 as shown during the positive data time following the positive going transition 63 in waveform 10, which transition represents the initial "1" and will, during the negative data time following negative transition 64 which occurs at the boundary for the bit cell in which the initial "1" is present, produce the following clock signal on line 52. Counter 53 will count the pulses generated during the positive data time; whereas counter 54 will count the pulses generated during the negative data time. A pulse into countered 53 not only steps that counter but additionally resets counter 54. Conversely, a pulse into counter 54 will step that counter and reset counter 53. The decoded outputs of counters 53 and 54 determine the size, sequence, and polarity of the wavelengths in the received data at terminal 10.

It should be noted that the phase encoded data pattern which is shown in FIG. 4 would represent the reading of PE data in a direction opposite that depicted in FIG. 2. The FIG. 4 pattern likewise has a characteristic that lends itself to decoding by wavelength measurement in accordance with the present invention. This characteristic is that a positive transition must occur for a "1," and a negative transition must occur for a "0" which makes it necessary to write a long positive wavelength whenever the data changes from a "1" to a "0," and a long negative wavelength when the data changes from a "0" to a "1." With reference to FIG. 4, this means that the "1" transition 46, which is followed by a "1" to "0" transition as represented by the negative going transition at 47, has a long wavelength therebetween. A similar circumstance exists between the "0" to "1" transition at 48 and 49.

In observing FIG. 4, it can be noted that an output is produced by either counter 53 or counter 54 whenever two consecutive pulses are present on one of the outputs of decoder 50. That is, a pulse on line 55 or 56 will be present whenever a binary data transition occurs in waveform 10. The decoded count of 2, as is indicated through line 55 for counter 53, occurs during each positive long wavelength in the PE pattern 10. The decoded count of 2 from counter 54 on line 56 appears during each negative long wavelength of the PE pattern and signifies a "0" to "1" transition. The signals on lines 55 and 56 are passed through OR-circuit 57 so as to produce the switching signal as the input for binary trigger 58. Thus, DC binary trigger 58 will change its output state in response to each pulse on either line 55 or line 56 through OR 57. The data synchronized clock signal at terminal 11 is passed through frequency divider 61 which divides by two and produces one output pulse per bit cell time. This output of divider 61 is combined with the output of binary trigger 58 in AND 62 which results in the decoded gated "1's" signal at output terminal 60.

Although the embodiment shown in FIG. 3 provides gating of only "1's" as the output, obviously line 59 could be passed through an invert circuit as one conditioning input for an additional AND circuit with the output of frequency divider 61 providing the other input for that AND circuit. This would provide gating of "0's" in a manner somewhat similar to the dual output of FIG. 1.

The decoding technique shown in FIG. 3 is particularly well suited for error detection on a single track basis for magnetic tape recording systems. This can be accomplished in several ways. For instance, the outputs indicative of a decoded 2 count from counters 53 and 54 must be interleaved. If the decoded count of two output for either counter 53 or 54 has two consecutive outputs not interleaved with the other, this represents an error condition. This error is the result of either excessive phase shift (greater than ±25 percent, for instance) or noise occurring on the data during a positive transition of the clock.

Another method for determining an error condition is to inspect the output of counters 53 and 54 to determine whether or not an attempt has been made to introduce three pulses to either counter. A count of three would signify an illegal wavelength and, therefore, an error condition would be flagged. Again, such a circumstance would indicate noise or excessive phase shift in a series of either short or long wavelengths.

Figure 6:
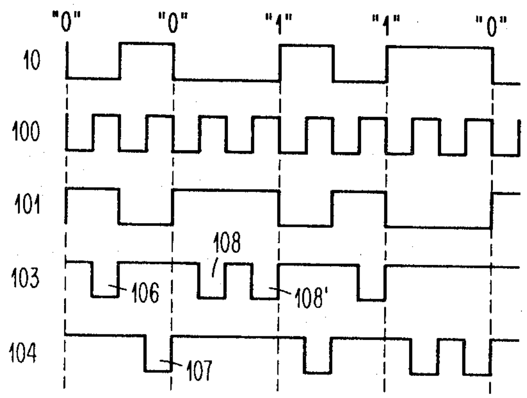
Figure 7:
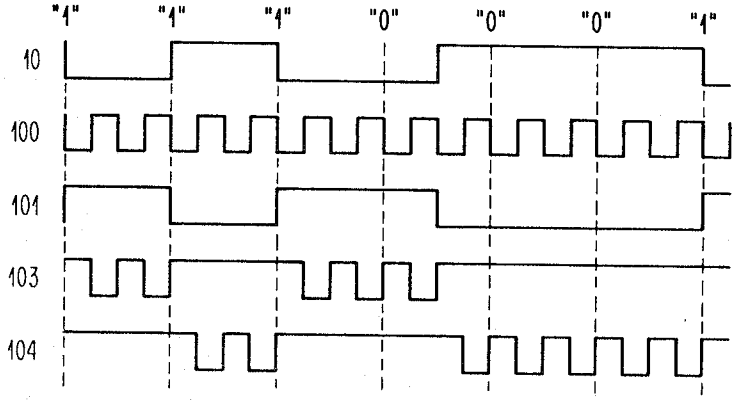

Circuitry for performing the function of wavelength decoder 50 of FIG. 3 is shown in detail in FIG. 5 with the associated time-base diagram being shown in FIGS. 6 and 7. Broadly, the FIG. 5 circuit logically gates clock pulses out for counting in a manner dependent upon whether the last transition in the data waveform was positive or negative and stores an indication of the last transition via feedback interconnections. The phase-encoded data shown at 10 in FIG. 6 depends on both data transitions and also the direction of those transitions. That is, as shown in FIG. 6, a positive transition at the bit cell center represents a one and a negative transition represents a zero. The MZE and MFE codes depend on data transitions and the time between transitions or the period of the wavelength. The FIG. 5 circuit is likewise adapted to MFE and MZE operation as is shown in FIG. 7, and the utility thereof will be more apparent in the description of FIG. 8.

The FIG. 5 circuit has the unique ability for providing the information required for detecting PE, MFE, MZE, or similarly encoded information. OUtputs 103 and 104 signify the period between transitions, the fact that a transition has occurred, and the direction of the transitions. Essentially, the FIG. 5 decoder operates by comparing the data signal at 10 with the clock signals introduced at terminal 100. These two signals for the encoding schemes involved have a definite frequency/phase relationship. Further, clock signal 100 is ADC or variable frequency clock (VFC) derived and, therefore, follows the variations in data patterns.

During a negative transition in data input 10, AND 97 is conditioned so that an output occurs at terminal 103 for every positive clock pulse 100. The converse holds true for AND 99 and the output pulses appearing at 104. This means that, throughout the data pattern, output pulses appear at 103 for negative data time while output pulses appear on 104 for positive data time. Therefore, by logically interpreting the 103 and 104 outputs as is done by the circuitry of FIGS. 3 and 8 of this invention, it is possible to determine the wavelength of data by the number of output pulses, the time a transition has occurred and the direction of that transition.

With respect to FIGS. 3 and 6, this means that pulse 106 at 103 will increment counter 53 by one. The intervention of pulse 107 on 104 will cause counter 54 to be incremented by one, but counter 53 will be reset at the same time. However, the subsequent appearance of consecutive pulses 108 and 108′ at terminal 103 will cause binary trigger 58 to be switched so that the gating out of "1's" will be initiated. This would continue until the next long wavelength which symbolizes a "1" to "0" transition as shown in FIG. 6.

Several advantages are realized by the use of the FIG. 5 wavelength decoder in the present invention. First, the FIG. 5 circuitry is insensitive to phase shifting of 25 percent or less of a bit period. Second, this circuitry is sensitive to noise for only one logic block of delay at each positive clock transition. These advantages are inherent in the feedback of the 103 and 104 signals as conditioning inputs for AND's 96 and 98, respectively. If data at 10 is in a given condition at the positive transition of a clock pulse at 100 long enough for the proper output (103 or 104) to go negative, this output is fed back in such a way as to hold the circuit in that state regardless of what data may then do. It should be noted that these positive transitions of clock 100 occur away from the data transitions where the signal is most susceptible to noise.

Figure 10:
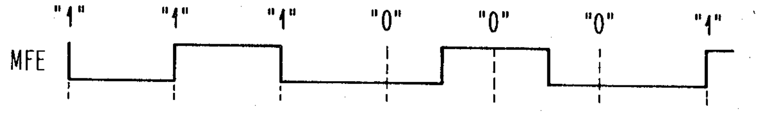
FIG. 10 shows the relationship of the data sequence of line 10 in FIG. 7 to a typical MFE pattern.
Figure 8:
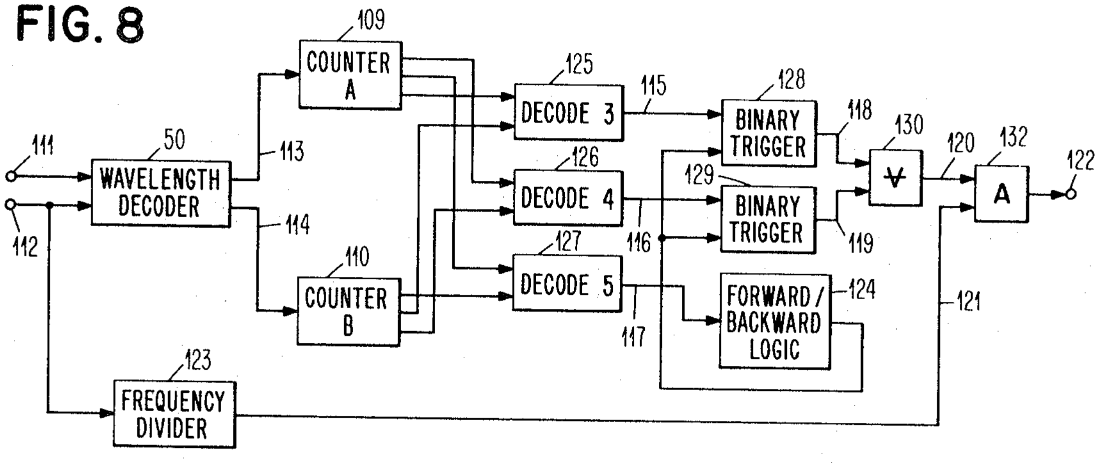
Figure 9:
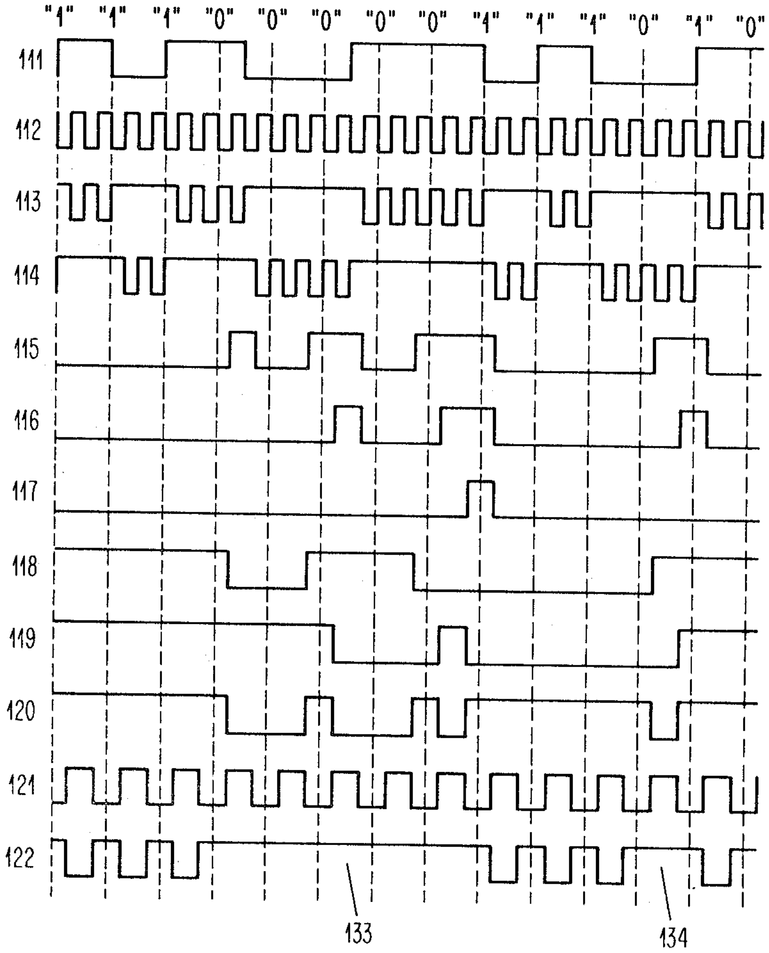

FIG. 8 illustrates the present invention particularly adapted for separating binary data from a waveform encoded in MZE patterns with FIG. 9 providing the time-base diagram of the operation for FIG. 8. Note that in this configuration, the clock signals introduced at terminal 112 are generated so that they complete two cycles for each bit cell length. Using these two clock cycles as a basic wavelength unit size of 2, the MFE data pattern consists of combinations of wavelengths of sizes 2, 3, and 4; whereas the MZE pattern consists of combinations of 2, 3, 4, and 5. To put it another way, the size is determined by the number of clock cycles occurring within a given wavelength. Since the MFE and MZE encoding patterns differ only by the additional 5 wavelengths of the MZE pattern, their coding is identical with the exception of this particular wavelength. To illustrate the differences between MFE and MZE, compare line 10 of FIG. 7 with the FIG. 10 illustration, both waveforms representing the same information in their respective encoding schemes. The MZE decoding technique uses the detected 5 wavelengths to condition the circuitry for gated ones in a forward direction and for gated zeros in a backward direction. Since the MZE detection is inclusive of MFE, the MFE detection has not been illustrated herein separately, but will be readily understood by those having normal skill in the art in view of FIG. 8.

The MZE pattern as introduced in the data waveform at terminal 111 is decoded through the FIG. 8 circuitry to provide decoded 1's at output terminal 122. Data waveform 111 and clock signal 112 are introduced to wavelength decoder 50 which operates in the same manner as has been discussed hereinbefore for FIG. 5. However, decoder 50 would provide output signals in the manner illustrated in the time-base diagram of FIG. 7 for functioning with the FIG. 8 circuitry. The resulting outputs from wavelength decoder 50 are produced at lines 113 and 114 as shown.

Line 113 is introduced to counter 109 while line 114 is introduced to counter 110. Counts of 3, 4, and 5 are next sensed by decoders 125, 126, and 127, respectively, either by decoding counts contained in counters 109 and 110 or by separately counting the overflows of either counter 109 or 110. A decode of 3 out of either counter 109 or 110 is used to step binary trigger 128, thus generating the signals appearing on line 118. Further, a decode of a 4 count from either counter 109 or 110 is similarly used to generate the signals on line 119. Finally, a 5 decode output is used to condition binary triggers 128 and 129 to the proper state for gating ones or zeros depending upon the direction of the wavelength as detected at the reading station. That is, assuming that the data waveform 111 has been reproduced from the read head of a magnetic tape system, the forward/backward logic 124 would be initialized depending upon the direction of movement of the magnetic tape. The outputs 118 and 119 of binary triggers 128 and 129 are combined through Exclusive OR 130 which results in the signal shown at line 120.

The clock signals 112 are passed through frequency divider 123 which essentially divides the clock signals by 2. Thus, the output of frequency divider 123 is illustrated at line 121 and is ANDed with the output of EOR 130 by means of AND 132. The result is the gating of decoded ones at terminal 122 as illustrated. If slivering should be a problem, then frequency divider 123 could be a four step cock which produces positive pulses at the same frequency as shown at 121 but with positive pulse widths half of that shown.

It should be understood that the level of line 120 could be passed through an invert circuit into yet another AND-circuit state similar to 132 for combining with the output of frequency divider 123 at line 121. This would result in the gating of zeros during the gap between the gated ones shown on line 122. That is, intervals 133 and 134 shown on line 122 of FIG. 9 would be the time period during which gated zeros would be produced.

The FIG. 8 circuitry operates somewhat similar to FIG. 3 in that the initial incrementing of a count into counter 109 will concurrently clear counter 110. In addition, this initial count would clear any counts present in decoders 125, 126, and 127. Of course, the inverse applies to the introduction of an initial count to counter 110 in the clearing of counter 109 and decoders 125, 126, and 127. It should be understood that decoders 125, 126, and 127 could be separate count stages or, alternatively, counters 109 and 110 could be capable of storing at least up to a 5 count with decoders 125, 126, and 127 coupled to both those counters for interpreting the counts stored therein.

The FIG. 8 circuitry is likewise readily adaptable for error detection indications. That is, the wavelength detection apparatus in accordance with the present invention for MFE and MZE encoded patterns has a similar error detection capability to the phase encoded system described hereinbefore. This is accomplished by adding circuitry for detecting illegal wavelengths such as a 1 or a 6 or by detecting illegal wavelength patterns in sequences such as a 2–3–2 pattern in MZE. This error detection capability may be used in conjunction with error correction to help locate and correct the error in a given byte.

It should be noted that the wavelength detection of decoder 50 in the FIG. 8 circuitry enjoys the same noise and phase shift rejection capability discussed hereinbefore. In addition, wavelength detection is effected in FIG. 8 by a completely digital detection system and its frequency of operation is that of the VFC. This gives it the advantage of being frequency independent.

While the invention has been particularly shown and described with reference to preferred embodiments thereof, it will be understood by those skilled in the art that various changes in form and details may be made therein without departing from the spirit and scope of the invention. For instance, the line trigger 18 of FIG. 1 could be replaced by circuitry in accordance with the wavelength decoder shown and described in FIG. 5 and a latch coupled across the output of that decoder. That is, output 103 in FIG. 5 could be used to provide a set input to that latch while line 104 could provide the reset input.

What is claimed is:

1. A system for recovering binary data from a waveform encoded so that a signal has a signal portion with one cycle length equivalent to the length of a bit cell occurring at wavelength L and data transitions from one binary state to another are denoted by a waveform transition in the center of a bit cell which transition is preceded by and/or followed by a signal portion at a wavelength of NL where N is any whole or fractional number not less than unity within a range of numbers less than K where K is a constant greater than unity, comprising:

digital logic detecting means for detecting waveform transitions in the approximate center of a bit cell accompanied by signal portions in said waveform at least at one of said NL wavelengths and for producing data indicating outputs in response thereto, means for producing a bit cell pulse corresponding to each bit cell time of the binary data in said waveform, and digital logic gating means for gating said bit cell pulses to indicate first data, said gating means being alternately conditioned and deconditioned for gating said bit cell pulses in response to the data indicating output of said detecting means, and producing a first data indicating output when said long wavelength is preceded by a positive transition and a second data indicating output when said long wavelength is preceded by a negative transition, said detecting means further including decoding means for producing either said first or second output pulses for each signal portion proportional to a bit cell length or said first or second output pulses for each signal portion having a long wavelength, said gating means including first and second counting circuits each having at least two counting stages, said first and second counting circuits being coupled to count said first and second output pulses respectively, each of said counting circuits being reset in response to entry of a count in the other said counting circuit, said gating means further including binary switching means responsive to entry of a 2 count in either of said counting circuits to switch from one state to the other, whereby said gating means is alternately conditioned by said binary switching means for gating binary data representing signals.

2 Apparatus in accordance with claim 1, wherein said counting circuits each are capable of storing three or more counts, and which further includes means for indicating an error condition of counts greater than two are entered into either of said counting circuits.

3. Apparatus in accordance with claim 1 wherein said gating means includes switching means for controlling the alternate gate conditioning and deconditioning, and wherein said detecting means includes counting means and clock means for producing at least one clock means pulse for each data signal portion having a wavelength L and for producing a greater number of pulses for signal portions having longer wavelengths, said counting means being coupled for counting said clock means pulses, and logic means response to outputs from preselected counting stages of said counting means for producing a signal indicative of shifts in data between L and NL wavelengths with said indication signal being coupled for changing the state of said switching means.

4. Apparatus in accordance with claim 3, particularly adapted for phase encoded signals wherein said switching means is a binary switching means, said detecting meaNs includes decoding means coupled to receive said waveform and said clock means pulses for alternately providing first and second output control signals with said output control signals including one control pulse for each signal portion at the L wavelengths and two control pulses for each signal portion at the NL wavelengths, and wherein said counting means includes first and second counters coupled to receive said first and second output control signals, respectively, and each counter producing a counter output in response to storage of 2 counts therein, and said logic means includes an OR-circuit coupled between the said counter outputs and said binary switching means for changing the state of said switching means in response to said counter outputs.

5. Apparatus in accordance with claim 4 wherein said counters are cross-coupled so that storage of any count in one of said counters will reset the other said counter, and which further includes means coupled to said counters for responding to any attempt to store a count greater than two in either of said counters for indicating an error condition.

6. Apparatus in accordance with claim 3 particularly adapted for waveforms encoded so that one binary state is indicated by signal portions occurring at wavelength L and the other binary state is indicated by signal portions at several NL wavelengths wherein said clock means produces two clock means pulses for each waveform bit cell time, said detector means includes decoder means for passing said clock means pulses to either of two output lines with said clock means pulses being switched to another of said lines each time a transition is encountered in the waveform, said counting means including first and second counters responsive to said decoder for counting said clock means pulses and each connected to be reset by introduction of a count to the other, each having an overflow count state indicative of an excessively long signal portion, common decoding means coupled to respond to overflow counts from either of said counters, and said logic means being coupled to interpret the state of said common decoding means, said switching means being responsive to said logic means and said bit cell pulses for selectively gating out binary data indicating pulses.

7. Apparatus in accordance with claim 6 wherein said common decoding means is arranged for sequentially decoding counts greater than 2 in either of said first and second counters, said common decoding means being reset by the initial count into either of said first and second counters, said logic means including first and second binary triggers switching signal states in response to outputs from said common decoding means indicating counts of 3 and 4, respectively, said switching means includes an AND circuit an Exclusive OR (EOR) circuit with said EOR circuit being coupled to said binary triggers for providing one input to said AND circuit, said bit cell pulses providing the other input to aid AND circuit, said circuits being arranged so that a change in signal state in either of said binary triggers signifies a data transition in said waveform and will alternately condition and decondition said AND circuit for gating out said bit cell pulses.

8. Apparatus in accordance with claim 7 which further includes means responsive to any counts representing illegal waveform patterns for indicating an error condition.

* * * * *